United States Patent [19]
Jones et al.

[11] Patent Number: 5,827,595
[45] Date of Patent: Oct. 27, 1998

[54] AUTOMOTIVE TRIM PANEL HAVING A SHIRRED APPEARANCE

[75] Inventors: Vincent H-H Jones, Lake Orion; Scott M. Kloock, Washington, both of Mich.

[73] Assignee: Simco Automotive Trim, Inc., Roseville, Mich.

[21] Appl. No.: 797,641

[22] Filed: Jan. 31, 1997

[51] Int. Cl.⁶ .................................................. D05B 35/08
[52] U.S. Cl. ........................... 428/71; 156/85; 156/205; 156/245; 428/181; 428/319.7
[58] Field of Search ........................... 428/31, 71, 319.7, 428/181; 156/85, 205, 245

[56] References Cited

U.S. PATENT DOCUMENTS 4,259,408  3/1981  Moschter ............................. 428/319.7
5,073,429  12/1991  Steinke et al. .............................. 428/71

*Primary Examiner*—Henry F. Epstein
*Attorney, Agent, or Firm*—Dorn, McEachran, Jambor & Keating

[57] ABSTRACT

A panel adaptable for use in automotive trim applications has a laminate of a support layer and an A-side layer made of vinyl or cloth. The support layer is made of a thermoformable material such as foam, felt or polypropylene. The laminate is thermoformed to impart the contour of a rigid substrate to which the panel will be attached. The support layer retains the desired contour without the use of other materials. The panel may have a shirred appearance imparted thereto by the inclusion of a plurality of gathers thermoformed into the support layer.

15 Claims, 2 Drawing Sheets

AUTOMOTIVE TRIM PANEL HAVING A SHIRRED APPEARANCE

BACKGROUND OF THE INVENTION

The interior trim appearance of an automobile has been a key area of marketing focus. Interiors are often given treatments which provide increases in perceived value as well as brand differentiation. Efforts to cut costs by removing even small interior trim details have met with significant adverse sales impact.

An automotive interior feature having significant customer appeal is a shirred appearance, which may be described as a group of small, generally parallel ridges or upraised portions resulting from the gathering, bunching or hand tucking of either a textile or leather material. These ridges will be referred to herein as gathers. In the automotive world a shirred leather trim detail was a sign of a hand-built or custom styling touch found only in the finest automobiles. This perception has not been lost on the mass producers of automobiles or their stylists.

In an effort to duplicate this styling mass producers have employed leather and simulated leather made of vinyl. The shirred appearance has been typically achieved by either vacuum forming, casting or hand application and assembly, or a combination of these approaches. Both vacuum forming and casting techniques are generally limited to blank fed or cavity fed operations. Hand forming or a hand application are time consuming, laborious and expensive.

Typical constructions may utilize a metal substrate with a toy tab type fastening technique, or a variety of padded, foamed or other laminates attached to various substrates such as metal or wood fiber. Fastening techniques utilize the full array of methodologies such as spun welded fastening trees, toy tabs and adhesives. Comparing the costs of these methods currently employed to achieve a shirred appearance, hand assembly is the most expensive, casting is somewhat less and vacuum forming is the least expensive.

SUMMARY OF THE INVENTION

The present invention is directed to an automotive trim panel and a method for making a panel that has gathers pre-formed in the panel. The panel has a so-called A-side layer laminated to a support layer. The A-side layer is the layer which will be exposed to the automobile interior. Typically it could be vinyl or cloth or other material. Generally, the A-side material on its own lacks sufficient stiffness to retain any particular contour. The support layer is a thermoformable material, such urethane foam, polyethylene foam, felt or polypropylene. Either the urethane or polyethylene foam may be either closed or open cell, and may be thermo or chemically cross-linked.

This laminate of A-side layer and support layer is thermoformed to impart a plurality of gathers, as well as the contour of the substrate to which the panel will be attached. The thermoformed support layer will have sufficient stiffness to retain the gathers and contour even though the A-side layer would not do so by itself. The gathers are spaced from the edges of the panel.

Thermoforming is defined as the forming of a thermoplastic sheet by heating it and then placing it onto a mold surface to shape it. Cooling takes place in the mold so when the part comes out it will retain the shape of the mold. The formed trim panel of the present invention can be applied to a relatively rigid substrate using any of the known techniques. The trim panel affords precise location, stretch and thinning avoidance, and material savings, including the elimination of much of the current waste associated with edge trimming.

DETAILED DESCRIPTION OF THE INVENTION

Figure 1:
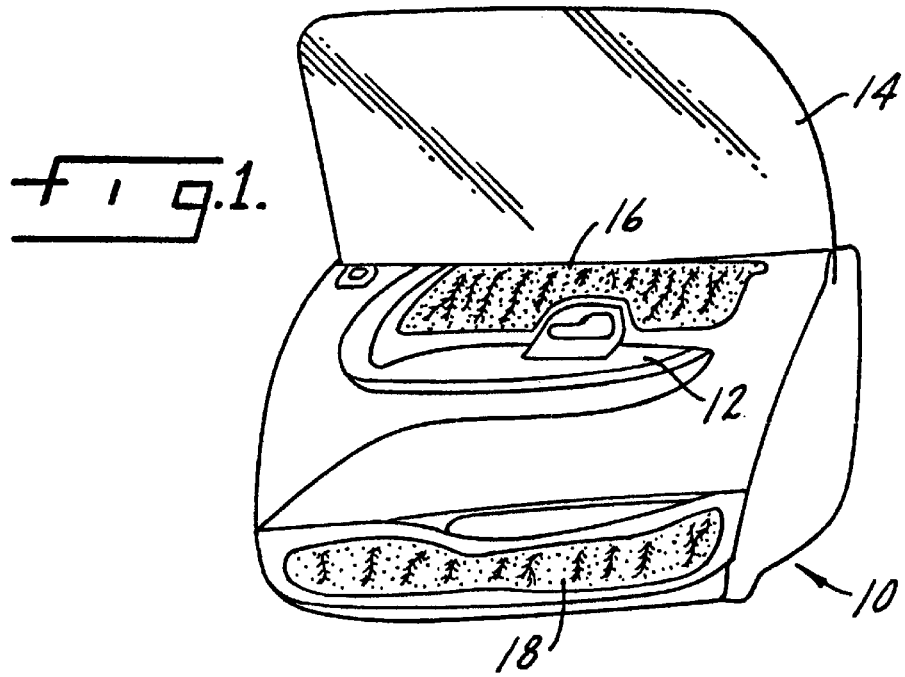
FIG. 1 is a schematic elevation view of a door panel having trim panels with gathers formed therein.

FIG. 1 illustrates trim panels formed in accordance with the present invention and installed on an automobile door 10. The door includes an arm rest 12 and a window is shown at 14. An upper bolster 16 covers the interior door substrate between the arm rest 12 and the window 14. The bolster has a shirred appearance. A map pocket scuff insert 18 is another trim part that may have a shirred appearance. It will be understood that many other interior trim parts may also incorporate the shirred appearance. The upper bolster and map pocket scuff insert are shown as illustrative of the concept.

Figure 2:
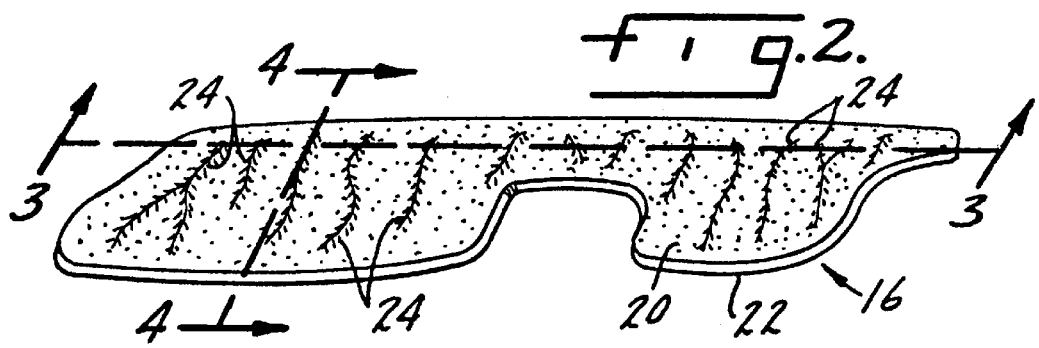
FIG. 2 is a perspective view of an upper bolster formed in accordance with the present invention.
Figure 3:
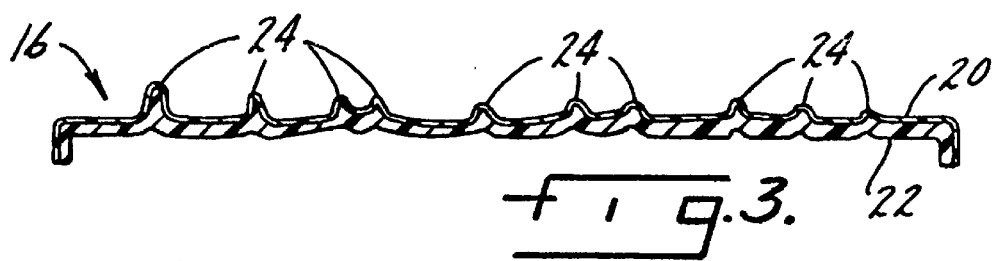
FIG. 3 is a section taken along line 3—3 of FIG. 2.
Figure 4:
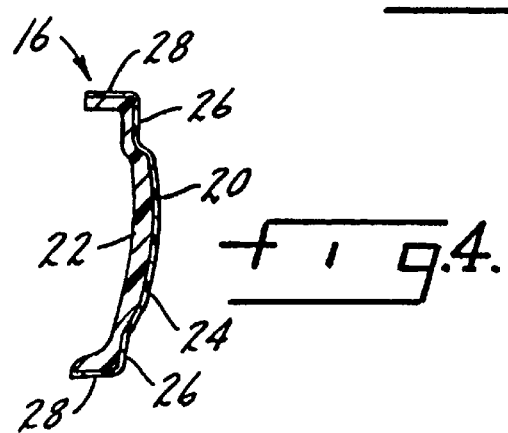
FIG. 4 is a section taken along line 4—4 of FIG. 2.

FIG. 2 shows the upper bolster 16 prior to assembly with the door substrate. The bolster includes an A-side layer 20 laminated to a support layer 22. A plurality of gathers 24 are thermoformed into the laminate. As can be seen in FIGS. 3 and 4, the gathers are molded into both layers. Thus, the thermoformable support layer 22 will retain the shape of the gathers, as well as the overall contour of the part.

It has been found that one of the keys to this process of obtaining a random gathered look is to gently complete each gather just before reaching the outer trim flange or edge of the part. In other words, the gather is feathered down so it terminates at a point where it is spaced from the edge of the part. This spacing is shown in FIG. 4 where transition zones 26 are defined between gather 24 and the edge or flange turn 28. Spacing the gathers from the edges allows the part to be formed to a given dimension and still look hand crafted.

Figure 5:
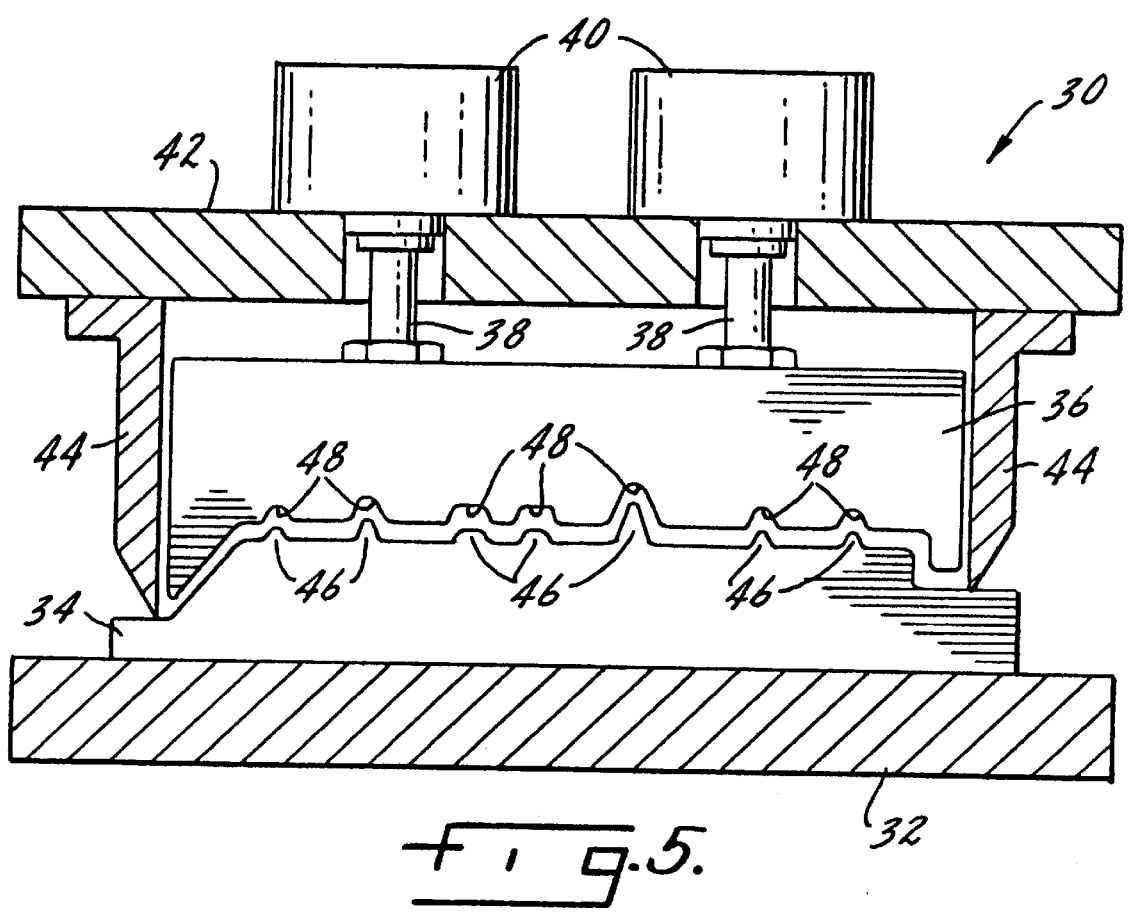
FIG. 5 is a section through the thermoforming tooling used to make a part such as that shown in FIG. 2.

An example of the tooling used to make the trim panels of the present invention is shown generally at 30 in FIG. 5. The tooling includes a cooling block 32 which supports a base or anvil form 34. An upper insert form 36, also sometimes called a stripper, is carried by the extension rods 38 of a pair of air cylinders 40. The cylinders rest on an upper mounting plate 42, with the rods 38 extending through plate 42. Trim blades 44 are fastened to the underside of the mounting plate 42 and move up and down with the plate. The laminate is introduced into the tooling with the A-side material facing the upper insert form 36 and the support layer facing the anvil 34.

The anvil 34 has a series of protrusions 46 on its upper surface. The upper insert form 36 has a corresponding series of grooves 48 which mate with the protrusions 46 to form the gathers 24. Further details of the thermoforming machine and the method of operating it are disclosed in the co-pending applications entitled "Automotive Trim Panel and Method of Making Same", invented by Vincent H—H. Jones and David L. Simon, and "Method of Thermoforming an Automotive Trim Panel", invented by Vincent H—H. Jones, David L. Simon and Scott M. Kloock, both filed on even date herewith and assigned to the present assignee. The disclosures of these applications are incorporated herein by reference.

The advantages of the shirred trim panel of the present invention include its utilization of thermoforming technologies to produce a quality enhancement. The trim panels are protected dimensionally in mating areas. They can be manufactured off of a continuous web of base materials with improved cycle times and more efficient cooling. The trim panels provide cost improvements over each of the prior methods of hand forming, vacuum forming and casting. The thermoformed support layer eliminates the need for a hard metal or wood fiber backing. If a foam is used as the support layer the need for a separate layer of padding is eliminated. The trim panels can be adhesively attached to a substrate, if desired.

While a preferred form of the invention has been shown and described, it will be realized that alterations and modifications may be made thereto without departing from the scope of the following claims.

We claim:

1. A panel for covering a substantially rigid substrate having a non-flat contour, the panel comprising an A-side layer and a support layer laminated to one another, the A-side layer by itself having insufficient stiffness to retain a particular shape, and the support layer having sufficient stiffness to impart to the panel a permanent, non-flat contour generally matching that of the substrate, the support layer and A-side layer containing a plurality of gathers to impart a shirred appearance.

2. The panel of claim 1 wherein the support layer is made from one of the group of urethane foam or polyethylene foam.

3. The panel of claim 1 wherein the A-side layer is vinyl.

4. The panel of claim 1 wherein the A-side layer is a textile material.

5. A panel for covering a substantially rigid substrate having a non-flat contour, the panel being made by the process of laminating together first and second sheets, the first sheet comprising an A-side layer which by itself has insufficient stiffness to retain a particular shape, the second sheet comprising a thermoformable support layer, and thermoforming the laminated sheets into a non-flat, contour generally matching that of the substrate with the support layer having sufficient stiffness to permanently retain said contour, the support layer and A-side layer containing a plurality of gathers to impart a shirred appearance.

6. The panel of claim 5 wherein the support layer is made from one of the group of urethane foam or polyethylene foam.

7. The panel of claim 5 wherein the A-side layer is vinyl.

8. The panel of claim 5 wherein the A-side layer is a textile material.

9. A method of making a panel for covering a substantially rigid substrate having a non-flat contour, the method comprising the steps of:
   a) laminating together first and second sheets, the first sheet comprising an A-side layer which by itself has insufficient stiffness to retain a particular shape, the second sheet comprising a thermoformable support layer; and
   b) thermoforming the laminated sheets into a non-flat contour generally matching that of the substrate with the foam layer having sufficient stiffness to permanently retain said contour, and wherein the non-flat contour includes a plurality of gathers to impart a shirred appearance.

10. An automotive trim panel having a shirred appearance including a plurality of upraised gathers in the panel, the panel comprising an A-side layer and a thermoformable support layer laminated to one another, the A-side layer by itself having insufficient stiffness to retain a gather, and the A-side and support layers being thermoformed such that the support layer will have sufficient stiffness to impart to the panel said plurality of permanent gathers.

11. The trim panel of claim 10 wherein panel the is bounded by edges and has a transition zone between the edges and the gathers which has no upraised portions.

12. The trim panel of claim 11 wherein the gathers are feathered to the transition zone of the panel.

13. The trim panel of claim 11 wherein the support layer is made of thermoformable foam.

14. The trim panel of claim 11 wherein the support layer is made of felt.

15. A method of making an automotive trim panel having a shirred appearance including a plurality of upraised gathers in the panel, comprising the steps of:
   a) laminating an A-side layer and a thermoformable support layer to one another, the A-side layer by itself having insufficient stiffness to retain a gather; and
   b) thermoforming the gathers into the A-side and support layers with the support layer having sufficient stiffness to permanently retain said gathers.

* * * * *